US005765043A

United States Patent [19]

Tyler

[11] Patent Number: 5,765,043

[45] Date of Patent: Jun. 9, 1998

[54] ENCLOSURE HAVING MOVABLE WINDOWED PORTIONS

[76] Inventor: Nelson Tyler, 15801 Royal Oak Rd., Encino, Calif. 90436

[21] Appl. No.: 855,859

[22] Filed: May 12, 1997

[51] Int. Cl.[6] .................................................. G03B 29/00

[52] U.S. Cl. .................................................. 396/12; 396/427

[58] Field of Search .................................. 396/7, 12, 13, 396/419, 427; 348/113, 117, 118, 143, 144, 148, 151; 352/242, 243

[56] References Cited

U.S. PATENT DOCUMENTS

| | | | |
|---|---|---|---|
| 3,638,502 | 2/1972 | Leavitt et al. . | |
| 4,796,039 | 1/1989 | Pagano | 396/427 |
| 4,821,043 | 4/1989 | Leavitt . | |
| 4,989,466 | 2/1991 | Goodman . | |
| 5,184,521 | 2/1993 | Tyler . | |

*Primary Examiner*—Howard B. Blankenship

*Attorney, Agent, or Firm*—Joseph F. McLellan

[57] ABSTRACT

An enclosure for housing and protecting a device adapted to be continuously aimed at an external target object. The enclosure includes inner and outer windowed portions which are movable relative to one another in response to movements of the device. The outer window is elongated and oriented around the tilt axis of the device to provide a line of sight to the target object at all times in response to tilting rotation of the device. The inner window is smaller and extends transversely of the outer window. Because the outer enclosure portion or dome overlies the inner enclosure portion or dome it blocks the line of sight to the target object except when the inner window is in registry with the outer window. When this occurs a relatively small opening affords a clear line of sight. The opening is small enough to limit wind loads to an acceptable level, so the opening is preferably left uncovered. If desired, however, this opening can be covered with a small section of glass or other protective material to completely isolate the enclosure interior from undesired environmental effects such as external wind loads and the like.

13 Claims, 3 Drawing Sheets

ENCLOSURE HAVING MOVABLE WINDOWED PORTIONS

FIELD OF THE INVENTION

The present invention relates to an enclosure for housing and protecting a device such as a camera or similar instrument adapted to be continuously aimed through the enclosure at an external target object.

DESCRIPTION OF THE PRIOR ART

The invention is useful in applications where it is important to enclose a precision instrument or device to protect it from environmental effects such as air turbulence and high wind loads, while yet affording a clear and unobstructed line-of-sight from the device to an external target object. The device can be any of a variety of devices intended to precisely track a target object, such as a vehicle mounted camera, telescope, surveying instrument or even a form of weaponry. In a typical situation, the device is one which optically "sees" the object through an opening in an otherwise opaque enclosure. However, the present invention is also applicable to non-optical systems such as infrared, radar or the like that are aimed through suitable openings or sections in the surrounding enclosure.

Various types of apertured or windowed enclosures are known in the prior art for housing such devices in a manner that permits the device to be continuously aimed through the enclosure at an external target object, despite movements of other portions of the system, such as movements of the vehicle which transports the device.

A specialized category of enclosures has evolved for mounting to a helicopter so that a camera housed in the enclosure can be conveniently transported to and from motion picture shooting sites. The enclosures shield the delicate camera and associated gyrostabilizing apparatus from wind loads and buffeting, and are constructed to provide a clear line of sight to the target object as much as possible. Please see U.S. Pats. Nos. 3,638,582 (Leavitt et al); 4,989,466 (Goodman); and 4,821,043 (Leavitt).

Much of this prior art is also concerned with the control mechanisms used for precisely aiming the instrument or device within the enclosure. In this regard, the present invention is primarily concerned, not with such control mechanisms, but with the structure and arrangement of the enclosure itself that makes it possible to provide a relatively small opening or window providing a clear line of sight from the opening to the target object.

In one prior art system a line of sight is provided throughout all orientations of the enclosure by simply making the complete enclosure transparent, in effect a single unobstructed window. The enclosed device is then free to pan left or right, and also tilt downwardly to a generally vertical position without obstruction of the line-of-sight to the target object. Unfortunately, it is difficult to achieve acceptable optical quality over the relatively large transparent area of such an enclosure. Furthermore, such an enclosure allows considerable light to enter from all angles, resulting in unwanted reflections on the front element of the camera lens.

Another prior art single window enclosure, especially designed for a helicopter camera system, is made opaque except for a single elongated window that extends generally circumferentially around the tilt axis of the camera. The relatively large elongate window is covered with a matching arcuate section of transparent material such as glass or plexiglas to protect the enclosed camera and associated equipment from wind loads. The configuration of the window thus provides an unobstructed line-of-sight through some part of the window throughout normal tilting and panning of the camera mount.

However, it is difficult to achieve good optical quality in the relatively large arcuate section of transparent material, and the size of the window also allows excessive light to enter the enclosure, causing undesired reflections on the front element of the lens. The apparatus of U.S. Pats. Nos. 4,989,466 and 3,638,502 are examples of this type of system.

In U.S. Pat. No. 4,821,043 another single window system is disclosed which eliminates the need for making the window elongated in order to provide a line of sight at all times during movement of the camera about its tilt axis. The enclosure of the patent is made spherical, and includes a pair of domes formed by cutting the enclosure in half along a circumference that lies in a plane inclined slightly relative to a vertical plane. One of the domes includes a window which is relatively small, which enables it to be fitted with a flat, transparent section of good optical quality glass, plexiglas or the like.

The other dome can be panned but not tilted. Separate tilting of the windowed dome is made possible by connecting the domes along the inclined split line between them, and providing a circumferential gear rack on one dome and a pinion gear on the other dome. Although it would have been desirable to be able to tilt the windowed dome about a horizontal tilt axis, this was not possible because its free tilting would have been prevented by the presence of a centrally located, vertically extending support for the unwindowed dome.

The inclined split line enables the windowed half dome to freely tilt past the vertical support, but the resulting axis of tilting is skewed or inclined relative to the tilt axis of the camera. As a consequence, when the windowed dome tilts up or down as it tracks the tilting of the camera about its horizontal tilt axis, the camera line-of-sight moves in a generally vertical plane but the window moves along a vertically inclined plane. Unless compensated for, this causes lateral movement of the window out of alignment with the camera line-of-sight such that the target object cannot be seen by the camera.

This problem is addressed in the apparatus of U.S. Pat. No. 4,821,043 by providing a special means that is operative to pan the enclosure in an amount just sufficient to compensate for the lateral movement of the window during its tilting. This keeps the camera line-of-sight and the window in alignment. However, the solution does not provide a solution for the undesirable slant angle of the window relative to the camera lens when, for example, the window is in its full tilt down position.

Of course, the window could be enlarged and provided with a larger covering to accommodate any lateral movement of the window relative to the camera lens, but this would present the optical problems characteristic of larger covered windows, and would also allow entry of excessive light into the enclosure, as previously mentioned. Also, simply leaving the window uncovered would eliminate unwanted reflections on the camera lens, but then the camera and interior of the enclosure would be exposed to wind loads.

SUMMARY OF THE INVENTION

According to the present invention, an enclosure is provided for housing and protecting a device such as for example a helicopter borne camera that is adapted to be continuously aimed at an external target object. The enclosure is made in two main parts, an outer enclosure portion or dome which overlies an inner enclosure portion or dome that is rotatable relative to the outer dome.

The enclosure includes at least two windows, one in each of the outer and inner domes. When these windows are aligned they define a relatively small opening providing a clear line of sight is between the enclosed device and the target object.

The outer window is generally vertically elongated and oriented around the tilt axis of the enclosed device. Thus, when the device rotates in a tilting mode, it moves along the length of the outer window. In a preferred embodiment, the outer window varies in width from top to bottom to allow greater transverse movement of the line of sight at certain angles of camera tilt, such as at or near a full tilt down position. This is desirable because any swaying of the transporting helicopter becomes more exaggerated as the camera moves toward its full tilt down position.

The multiple window enclosure of the present invention thus enables the provision of a minimum size opening or window throughout various angles of panning and tilting of the enclosed instrument or device.

The smaller opening reduces wind loads on the enclosed device to an acceptable level so that it is usually not necessary to cover the opening with transparent material. In addition, the arrangement of an inner dome within an outer dome facilitates detachment and separation of the domes from the parent or supporting structure for easy and immediate access to the enclosed device.

Alignment of the windows is achieved by moving the inner dome about a horizontal axis, usually in a tilting mode, to correspond with the tilting movement of the enclosed device which typically occurs when the device is aimed at the target object. In addition, the outer dome is rotatable about a vertical pan axis in correspondence with panning of the enclosed device, the combination of such tilting and panning being to align the windows with the line-of-sight of the enclosed device.

The invention is adapted for use with arrangements like that disclosed in U.S. Pat. No. 4,821,043. The inner dome would be mounted for tilting about the inclined tilt axis described in that patent. However, the vertical outer window would be made wide enough, and the horizontal inner window would be made long enough, that a clear line of sight would be maintained between the camera and the target object despite any relative lateral travel between the windows and the camera line-of-sight during tilting of the inner dome about its inclined tilt axis. There would be no need for any specially controlled additional panning of the enclosure to compensate for such relative lateral travel.

In addition, the nesting of the inner dome within the outer dome greatly simplifies the construction, operation and maintenance of the enclosure of the present invention, and particularly facilitates disassembly of the enclosure components to gain access to the enclosed camera.

In another embodiment of the invention the inner dome includes two windows, the main inner window mentioned above, plus a smaller second inner window located diametrically opposite the main inner window. With this arrangement tilting of the inner dome approximately 180 degrees will locate the smaller second inner window in alignment with the camera line-of-sight and the outer window. The smaller opening defined by the aligned windows in this arrangement gives better wind protection to the camera/lens package inside the enclosure when a wide angle lens is not being used, or when the helicopter is not doing steep turns or similar maneuvers.

Other aspects and advantages of the present invention will become apparent from the following more detailed description when taken in conjunction with the accompanying drawings.

DESCRIPTION OF THE PREFERRED EMBODIMENTS

As previously indicated, many of the individual components adapted for use with the present apparatus and their methods of operation are well known to those skilled in the art. Many are specifically disclosed and described in one or more of the patents identified above. Accordingly, descriptions of such components and methods of operation are omitted for brevity. Further, although one embodiment of the present apparatus is described in connection with a helicopter mounted two windowed enclosure housing a camera, the apparatus is equally useful in the mounting of various kinds of instruments, sensors and the like to many different kinds of vehicles, including fixed wing aircraft, blimps, boats, automobiles, camera dollies, etc.

In the description which follows, terms such as "vertical", "horizontal", "pan axis" and "tilt axis" are merely illustrative of one form of orientation of the components. It will be apparent as the description proceeds that nothing about the windowed enclosure itself dictates any limitation of its use to particular orientations of the windows, or particular orientations of the axes of rotation of the enclosure portions defining the windows.

Figure 1:
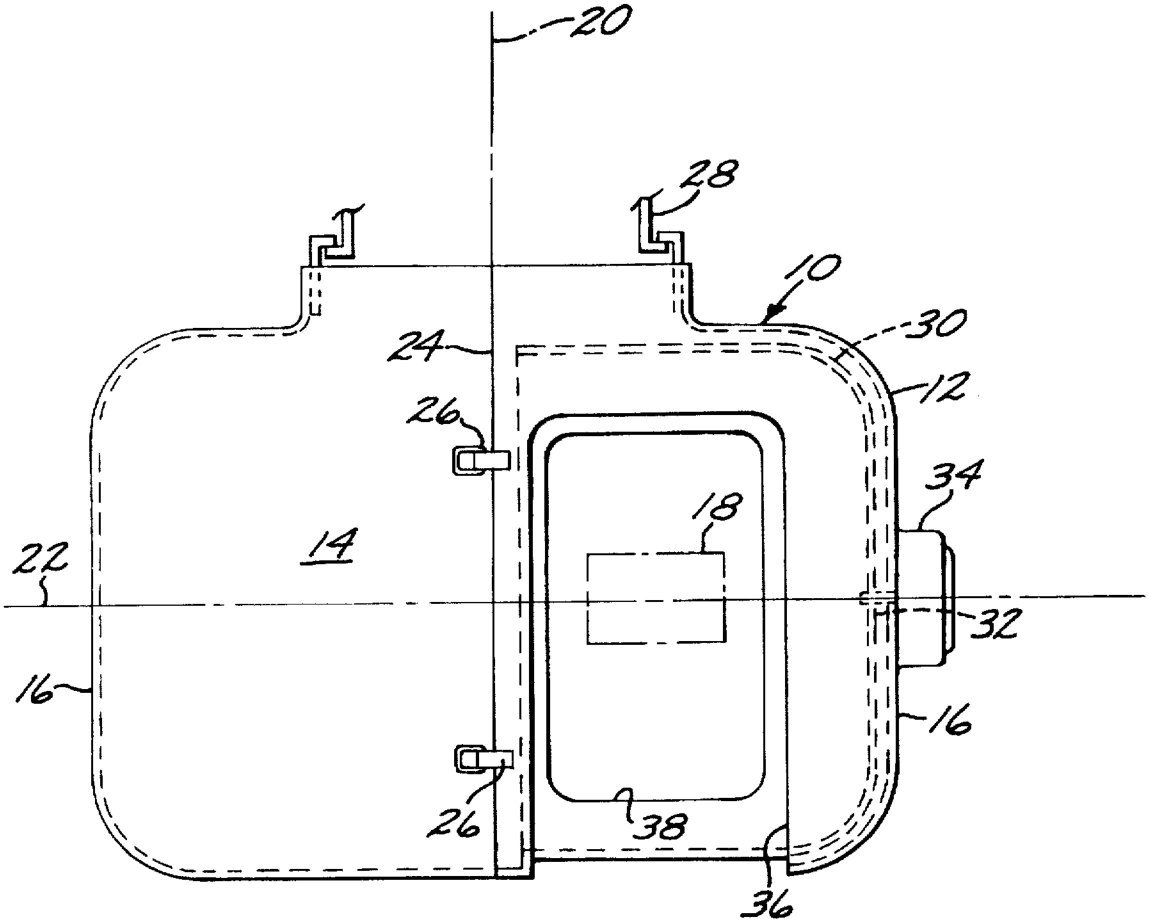
FIG. 1 is a partially schematic front elevational view of an enclosure according to the present invention, and particularly illustrating the generalized case of a two window enclosure defined by cooperating inner and outer domes.

Referring now to the drawings, and particularly to FIG. 1, the present apparatus comprises a fairing or enclosure 10 which may take any desired shape. In the illustrated embodiment the enclosure 10 has an outer dome 12 comprising a generally cylindrical center section 14 which includes flattened or squared off ends 16 that are smoothly faired into the center section. The enclosure 10 is designed to house any kind of precision instrument such as an instrument indicated diagrammatically at 18 that is adapted to be rotated about one or more axes, such as a panning rotation about a vertical pan axis 20 and a tilting rotation about a horizontal axis 22. Such panning and tilting are accomplished by any suitable drive means (not shown) under the control of a computer or human operator.

If the enclosed instrument is a camera the enclosure is made of opaque material to prevent entry of unwanted light. It is also made strong enough to resist air buffeting and wind loads which may be encountered in its use.

Panning and tilting of the instrument 18 enables aiming of the instrument at a selected, externally located target object (not shown). The instrument 18 may include one or more lenses for aiming at the target object by alignment of its line of sight with the object. As previously indicated, the precise construction of the enclosure 10 is not dependent upon the nature of the device which it encloses, and the enclosure design should not be construed as limited to use in a camera application.

Preferably the enclosure outer dome 12 is made in two sections that are joined along a splice or split line 24, and detachably held together by a plurality of suitable fasteners 26. The fasteners are of a quick release type well known in the art for quickly disconnecting the dome halves when access to the camera 18 is required.

The outer dome 12 is supported by structure, generally indicated at 28, which facilitates mounting of the dome 12 for rotation relative to a transporting helicopter (not shown). Such rotation takes place about a pan axis which is indicated at 20. As previously indicated, the mounting of the enclosure to a helicopter is merely exemplary. The enclosure could just as easily be mounted to almost any kind of transporting vehicle, including fixed wing aircraft, blimps, boats, automobiles, camera dollies, etc.

Typically the instrument 18 is gyroscopically stabilized and is rotated about the pan and tilt axes 20 and 22, respectively, under the control of an operator whose task is to aim the instrument 18 at a target object. Gyrostabilizing apparatus and associated components, such as sensors, drive motors, servo mechanisms, etc. for accomplishing this are well known in the art and a description thereof is omitted for brevity.

As will be seen, the dome 12 is slaved or controlled to rotate about the pan axis 20 in correspondence with panning movement of the instrument 18. Mechanisms for accomplishing this are also well known in the art.

The enclosure 10 also includes an inner dome 30 that fits within the enclosure center section 14 on one side of the split line 24. It is open at its inner end and is configured at its outer end to closely fit within the adjacent enclosure end 16.

The inner dome 30 is fixed at its outer end to the drive shaft 32 of a tilt motor 34 which is fixedly mounted to the enclosure end 16. With this arrangement the inner dome 30 can be rotated or tilted about the tilt axis 22 by the motor 34 under the control of a suitable means (not shown) for tracking movement of the instrument, and thereby causing the inner dome 30 to track or correspond with tilting movement of the instrument 18. There is ample clearance between the domes 12 and 30 to permit this.

The outer dome 12 includes a vertically and arcuately extending outer opening or window 36 of generally uniform width which, when aligned with the instrument line of sight, provides a clear line of sight from the instrument 18 to the target object at all operative angles of tilt of the instrument. However, the location of the inner dome 30 within the outer dome 12 obstructs this line of sight except when an inner opening or window 38 in the inner dome 30 is aligned with the outer window 36.

The inner window is generally rectangular and somewhat vertically elongated. However, it may take any configuration best suited for a particular application. For example, the particular window 38 illustrated is made large enough for use with a camera having multiple lenses.

In operation, the outer dome 12 is slaved to rotate or pan in correspondence with panning movement of the instrument 18, and thereby maintain the outer window 36 in alignment with the instrument line of sight. Likewise, the inner dome 30 is slaved to rotate or tilt in correspondence with tilting movement of the instrument, and thereby maintain the inner window in alignment with the instrument line of sight.

The net effect of these rotations with respect to the two window arrangement disclosed is that the aligned windows provide an opening for the instrument line of sight at all angles of instrument tilt through a window which is much smaller than would be the case with an enclosure having a single opening. The small opening results in greatly reduced wind loads on the enclosed instrument. This makes possible elimination of any protective cover over the window. Moreover, the outer dome halves may be separated quickly and easily to allow access to the camera 18, with the inner dome 30 being supported by one of the outer dome halves during such separation.

Referring now to FIGS. 2–7, an embodiment similar to that of FIG. 1 is illustrated. However, this embodiment is directed to an instrument which is a helicopter mounted, gyroscopically stabilized camera, and wherein the enclosure tracks tilting movement of the camera about a horizontal axis by tilting a portion of the enclosure about a tilt axis which is slightly inclined relative to a horizontal axis.

Many of the components of the embodiment of FIGS. 2–7 are identical to the embodiment of FIG. 1, in which case identical numerals are employed to designate such components. Where the respective components serve the same purpose and operate in essentially the same way, identical numerals are used with the designation "a" next to the numeral.

More particularly, the enclosure **1O*a* comprises an aerodynamic drag reducing spherical which encloses a gyroscopically stabilized camera 18*a*and most of the associated components. The enclosure 1O*a* is defined by a substantially hemispherical outer dome 12*a* having an elongated, generally vertically oriented outer window 36*a*, and by a substantially hemispherical inner dome 30*a* located within the outer dome 12*a* and having an elongated inner window 38*a* extending generally horizontally and transversely of the outer window 36*a*. The inner dome 36*a* is slightly smaller in diameter than the outer dome 12*a* to enable the inner dome 30*a*** to rotate relative to the outer dome.

When the outer and inner windows **36*a* and 38*a*** are aligned, the line-of-sight from the lens of the camera to the target object (not shown) is unobstructed, as will be seen.

The present invention is primarily directed to the arrangement, configuration, orientation and assembly of the inner and outer domes **30*a* and 12*a*, together with their respective windows 38*a* and 36*a***. Accordingly, the disclosure will deal with these components in some detail.

However, since various means are known in the prior art for gyrostabilization of instrument packages which include a camera or the like, and for moving all or a portion of the enclosure to track movement of the camera, a detailed disclosure thereof is omitted for brevity.

Figure 6:
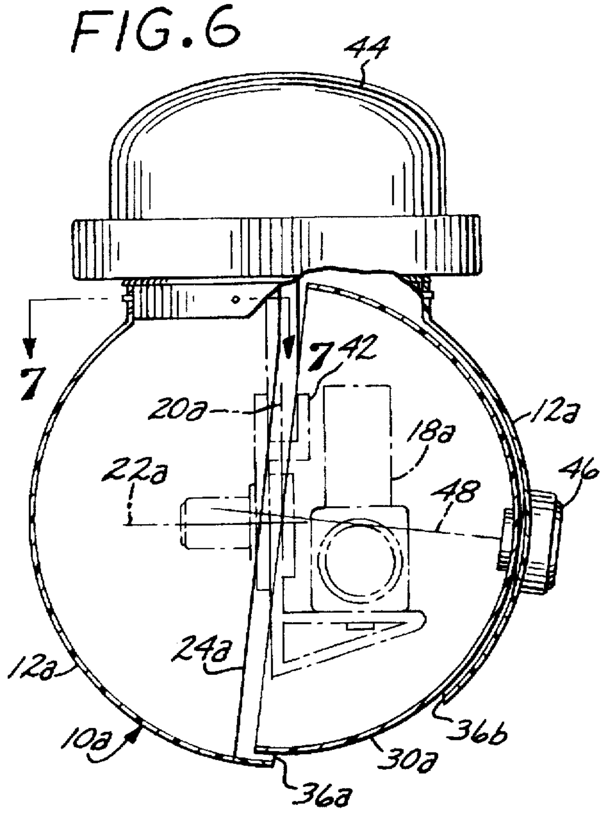
FIG. 6 is a view similar to FIG. 2, but illustrating the outer and inner domes in vertical cross section.

The apparatus includes a support assembly 42 which supports the instrument or camera 18a within the enclosure, as diagrammatically shown in FIG. 6.

The camera 18a is adapted for rotation by a suitable pan motor about a generally vertically oriented pan axis 20a, mechanisms for which are well known in the art.

In the present disclosure the various axes and component orientations are described as "horizontal" or "vertical" with respect to an enclosure which is assumed to be suspended from a helicopter that is flying straight and level, with the camera line-of-sight to the target object extending substantially horizontally.

In addition to such panning rotation, the camera 18a is also tiltable by a suitable tilt motor 30 in a manner well known in the prior art. Tilting is about a horizontally extending camera tilt axis 22a.

The support assembly 42 extends externally of the enclosure 10 and into a dome support structure 44.

A suitable gyroscopic or gyro stabilizing mechanism (not shown) is located adjacent the camera 18a, such stabilizing mechanisms being well known in the art, one form being disclosed for example in U.S. Pats. Nos. 3,638,502 and 4,821,043, as are the associated sensors, damping components and the like. Other forms may be used instead, if desired.

Rotation of the camera 18a about a vertical pan axis 20a is by any suitable means, which may be located in the structure 44.

The outer dome 36a is also rotatable about the pan axis 20a by a separate drive means (not shown).

An inner dome tilt motor 46 is secured to the exterior of the outer dome 12a, and its drive shaft extends through the outer dome 12 and is operatively coupled to the inner dome 30a for tilting the inner dome 30a about an inner dome tilt axis 48. It is important to note that the axis 48 is inclined relative to the horizontal mount tilt axis 22a of the camera.

With the foregoing arrangement, as will be apparent to those skilled in the art, when the camera aiming controls are actuated to align the camera line-of-sight with a target object, the camera panning drive in the dome support structure 44 (not shown) responds by panning the camera about the pan axis 20a, and the means for tilting the camera responds by tilting the camera about the tilt axis 22a. This continues until the usual sensors and servo circuits (not shown) determine that the position of the camera line-of-sight is in agreement with the input from the camera aiming controls.

Figure 2:
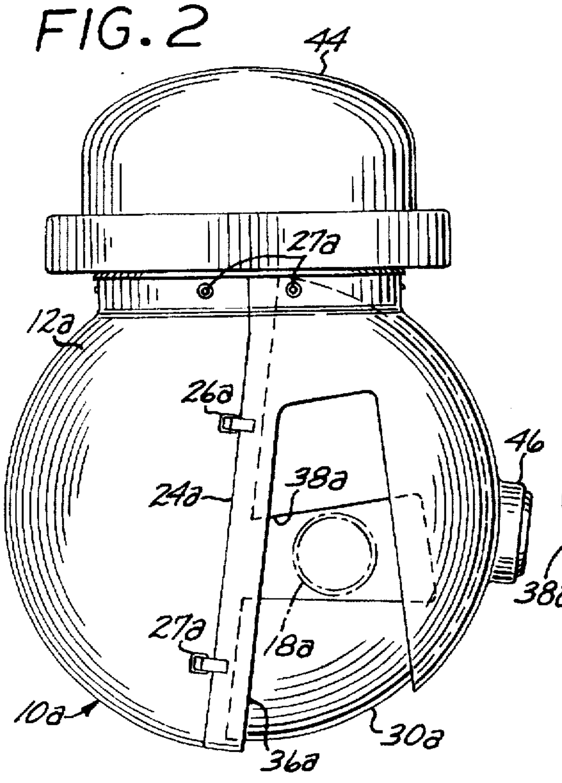
FIG. 2 is a front elevational view of a second embodiment of the enclosure of FIG. 1, especially adapted for use in connection with a helicopter mounted, gyroscopically stabilized camera mount.
Figure 3:
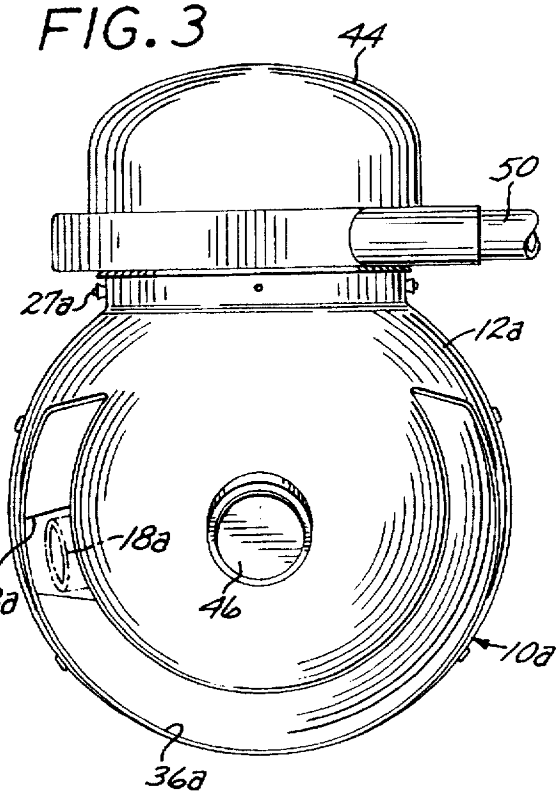
FIG. 3 is a left side elevational view of the apparatus of FIG. 2.
Figure 4:
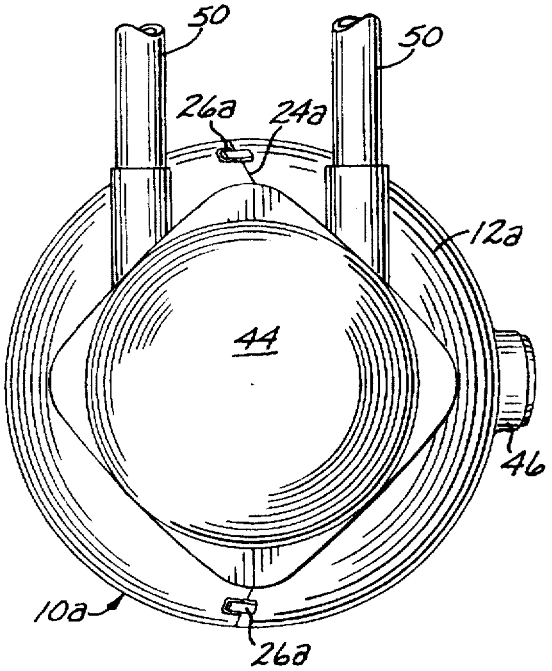
FIG. 4 is a top plan view of the apparatus of FIG. 2.
Figure 5:
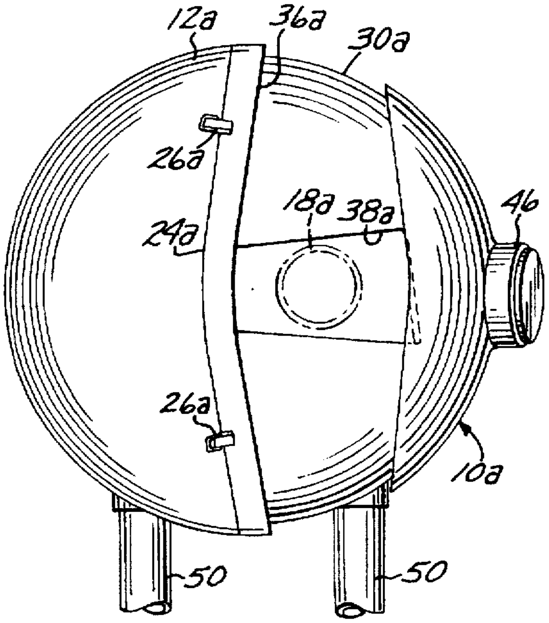
FIG. 5 is a bottom plan view of the apparatus of FIG. 2, but with the camera mount tilted to direct the camera line-of-sight vertically downwardly.

Simultaneously, a suitable outer dome panning means (not shown) also pans the outer dome 12a in correspondence with the panning rotation of the camera 18a. This will bring the outer window 36a into alignment with the camera line-of-sight, as best seen in FIG. 2.

Also simultaneously, the camera aiming controls actuate the inner dome tilt motor 46 to tilt the inner dome 30a about the inclined inner dome tilt axis 48 in correspondence with the tilting rotation of the camera 18a about its horizontal tilt axis 22a. This brings the inner window 38a into alignment with the outer window 36a to define a relatively small opening in alignment with the camera line-of-sight.

The foregoing disclosure sets forth the major functional characteristics of the apparatus of FIGS. 2–7. Certain details follow which explain the specific embodiment illustrated.

More particularly, with reference to FIGS. 2–7, the dome support structure 44 is adapted to be mounted to a helicopter (not shown) by any suitable means, such as by a pair of support arms 54.

The spherical outer dome 12a which is supported by the structure 44 is made of light weight opaque material such as fiberglass, and it is split or cut into two dome halves along a split or splice line 22a. The two halves are preferably detachably secured together along the splice line by a plurality of quick disconnect fasteners 26a. Quick disconnect pins 27a secure the upper margins of the dome halves to the support structure 44 so that the dome halves can be quickly and easily detached from each other and from the structure 44 to gain access to the interior of the enclosure when desired.

The outer window 36a is preferably of narrower width at its upper extremities, as best seen in FIGS. 2–5, as compared to its greater width at the bottom. This enables the window 36a to provide a clear line of sight at a full tilt down position of the outer dome 12, in which position any swaying of a transporting helicopter is most pronounced and has the effect of moving the line of sight horizontally within the window 36a. For similar reasons the configuration of the inner window 38a provides a greater width at its outer extremity. Obviously the configuration of the inner and outer windows may be varied as desired to suit any particular application.

In most other respects the operation of the enclosure 10a to bring the windows into alignment with each other to define an opening in alignment with the camera line of sight is the same as was described in connection with the embodiment of FIG. 1.

Figure 9:
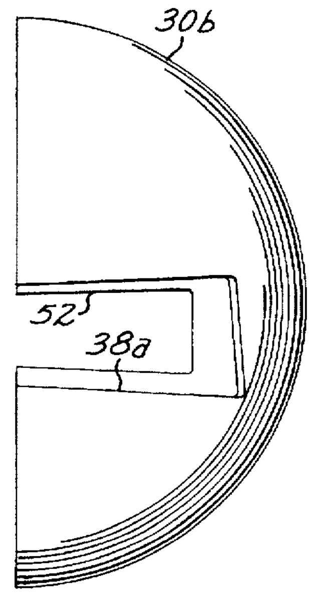
FIG. 9 is a front elevational view of the inner dome of the second embodiment illustrated in FIG. 8.
Figure 7:
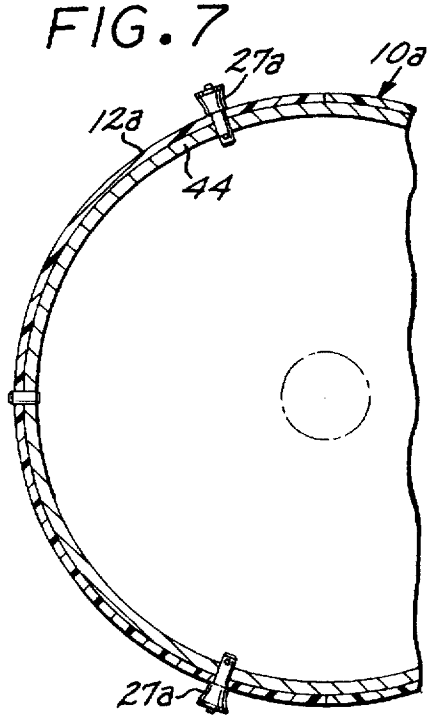
FIG. 7 is an enlarged view taken along the line 7—7 of FIG. 6.
Figure 8:
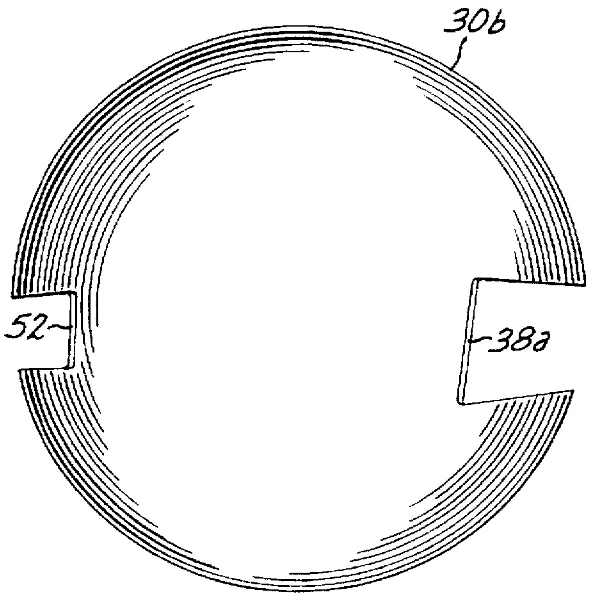
FIG. 8 is a side elevational view of a second embodiment of the inner dome that is characterized by a larger transverse inner window and a second, generally diametrically oppositely located smaller transverse inner window.

FIGS. 8 and 9 illustrate a second form of inner dome 30b which is useful to provide a smaller window 52 when the larger window 38a is larger than necessary. For example, if the use of a wide angle lens or steep turns or similar maneuvers of the helicopter are not contemplated, the size of the opening defined by the aligned windows can be reduced. This is also true if the camera is aimed generally horizontally, as compared with large tilt down angles.

Thus the inner dome 30b enables use of either the larger window 38a or the smaller window 52, the windows 52 being located such that tilting the outer dome approximately 180 degrees brings it into alignment with the camera line of sight instead of the window 38a. In all other respects operation of the inner dome 30b is the same as that of the inner dome 30a.

With this arrangement, as was true with the embodiment of FIG. 1, the size of the opening defined by the combination of windows 36a and 38a is relatively small, rendering the use of a protective covering unnecessary in most applications to shield the enclosed equipment from excessive wind loads.

Other changes and modifications will be readily apparent to persons skilled in this art. Therefore, the invention is not intended to be limited except by the scope of the following appended claims.

I claim:

1. An enclosure for housing a device adapted for selective rotation about a pair of intersecting axes to continuously provide a line of sight from the device to a target object, the enclosure comprising:

an outer dome having an elongated first window extending generally around one of the intersecting axes; and an inner dome located within the outer dome and having a second window extending generally transversely relative to the first window; the outer and inner domes being adapted for rotation in response to rotation of the device about the intersecting axes to align the first and second windows with the line of sight.

2. An enclosure according to claim 1 wherein the transverse dimension of the opening defined by the aligned first and second windows becomes wider at increasing tilt down positions of the enclosed device.

3. An enclosure according to claim 1 wherein the outer dome is split into a first section and a second section, and including fastener means located along the split line to secure together the first and second sections.

4. An enclosure according to claim 3 wherein the fastener means are selectively releasable to enable the split first and second sections to be separated from the remainder of the apparatus to gain access to the interior of the enclosure.

5. An enclosure according to claim 4 wherein the inner dome is rotatably carried by the second section of the outer dome whereby the inner dome is separable from the remainder of the enclosure along with the second section.

6. An enclosure according to claim 1 wherein the first window includes inner and outer side margins, and wherein the first window extends from the rear side of the outer dome, downwardly to the bottom of the outer dome, and upwardly from the bottom to the front side of the outer dome.

7. An enclosure according to claim 1 wherein one of the intersecting axes is a tilt axis for the device.

8. An enclosure according to claim 1 wherein the first window tapers downwardly from a narrow aperture at the rear side of the outer dome, to a wider aperture at the bottom of the outer dome, and upwardly to a narrow aperture at the front of the outer dome.

9. An enclosure according to claim 1 wherein the second window tapers from a narrow aperture adjacent its inner side margin to a wider aperture adjacent its outer side margin.

10. An enclosure for housing a device adapted for selective rotation about a generally vertical pan axis and a generally horizontal tilt axis to continuously provide a line of sight from the device to a target object, the enclosure comprising:

an outer dome having an elongated first window extending generally around the tilt axis; and an inner dome located within the outer dome for rotation with the outer dome about the pan axis, and rotatably carried by the outer dome for tilting rotation separately of the outer dome, the inner dome having a second window extending generally transversely relative to the first window, the inner and outer domes being adapted for rotation in response to rotation of the device about the pan and tilt axes to align the first and second windows with the line of sight.

11. An enclosure according to claim 10 wherein the transverse dimension of the opening defined by the aligned first and second windows becomes wider at increasing tilt down positions of the enclosed device.

12. An enclosure according to claim 11 wherein the device is a gyroscopically stabilized camera, and the inner dome is tiltable about a tilt axis which is inclined relative to a horizontal plane.

13. An enclosure according to claim 1 wherein the inner dome includes an additional window smaller than the second window, the additional window being located substantially diametrically opposite the second window, both the second window and the additional window extending transversely relative to the first window.

* * * * *